Figure 6:
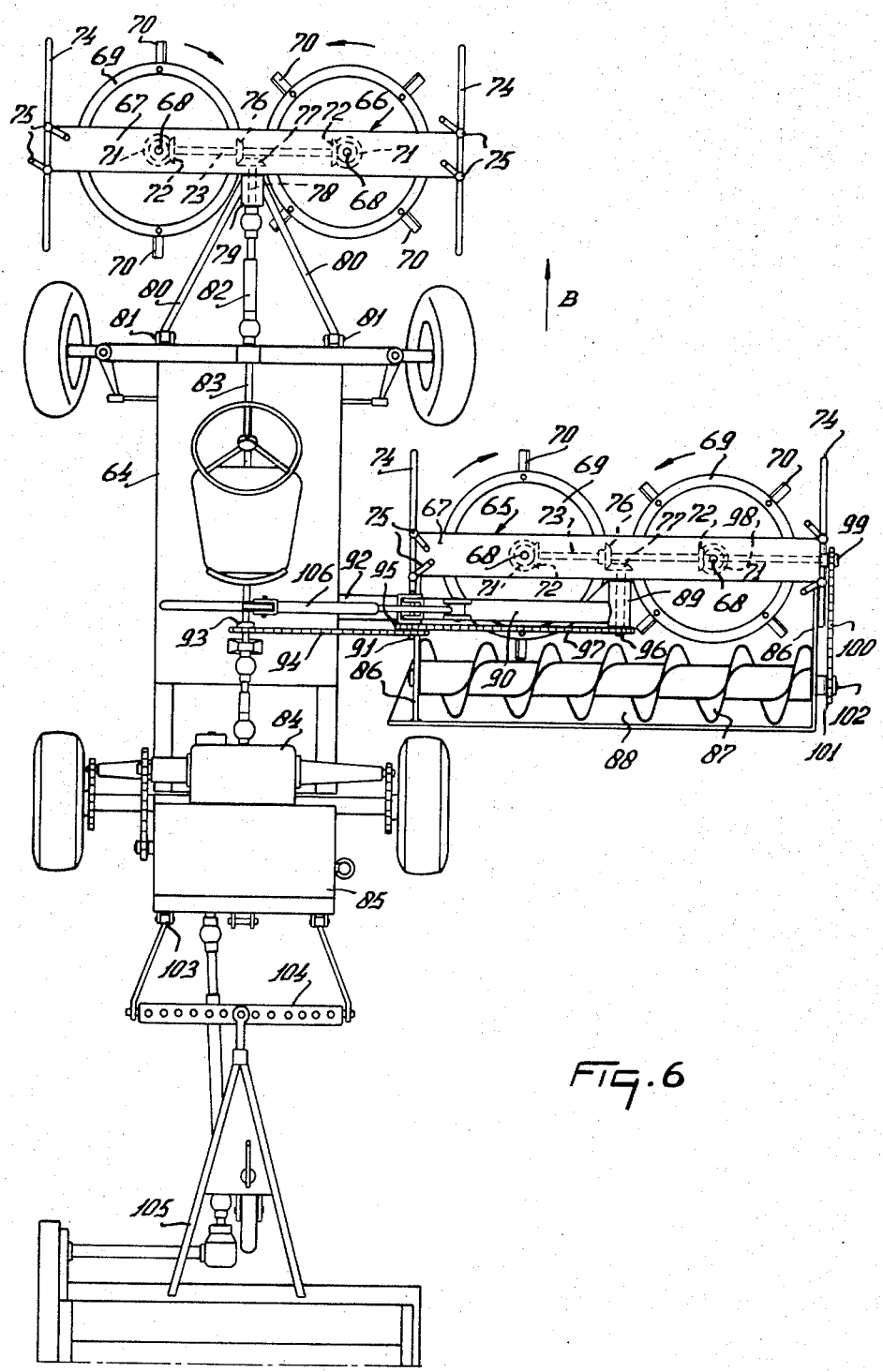

United States Patent [19]
van der Lely

[11] 3,717,981
[45] Feb. 27, 1973

[54] MOWING MACHINES
[76] Inventor: Cornelis van der Lely, 7, Bruschenrain, Zug, Switzerland
[22] Filed: Aug. 11, 1970
[21] Appl. No.: 62,998

Related U.S. Application Data
[63] Continuation of Ser. No. 778,444, Nov. 25, 1968, abandoned.

[30] Foreign Application Priority Data
Dec. 4, 1967 Netherlands .......................6716443

[52] U.S. Cl. .........................56/6, 56/13.6, 56/14.5, 56/15.8, 56/16.2, 56/192, 56/228
[51] Int. Cl. ...........................................A01d 75/30
[58] Field of Search.........56/6, 10.4, 228, 13.5–13.9, 56/7, 14.5, 15.7–15.9, 16.2, 157, 192

[56] References Cited

UNITED STATES PATENTS

| | | | |
|---|---|---|---|
| 3,103,090 | 9/1963 | Campbell | 56/6 |
| 1,917,556 | 7/1933 | Soss | 56/192 UX |
| 1,174,762 | 5/1916 | Quance | 56/157 |
| 2,477,389 | 7/1949 | Oehler et al. | 56/192 X |
| 2,484,981 | 10/1949 | Coultas | 56/192 |
| 3,236,034 | 2/1966 | Blettner | 56/6 |

FOREIGN PATENTS OR APPLICATIONS

| | | | |
|---|---|---|---|
| 123,364 | 8/1958 | U.S.S.R. | 56/192 |
| 6,509,625 | 1/1967 | Netherlands | 56/13.5 |
| 122,978 | 11/1958 | U.S.S.R. | 56/6 |
| 174,458 | 5/1962 | U.S.S.R. | 56/192 |

Primary Examiner—Louis G. Mancene
Assistant Examiner—J. A. Oliff
Attorney—Mason, Mason & Albright

[57] ABSTRACT

According to this invention, at least one mowing mechanism is mounted on a mobile frame, and the mowing mechanism has a frame beam which extends transverse to the intended direction of travel during use of the machine. The frame beam is spaced from the cutting elements with the mowing mechanism having a single support which is located approximately centrally along the frame beam. The frame beam is pivotable about an axis afforded by said support during use of the machine to match ground undulations.

9 Claims, 8 Drawing Figures

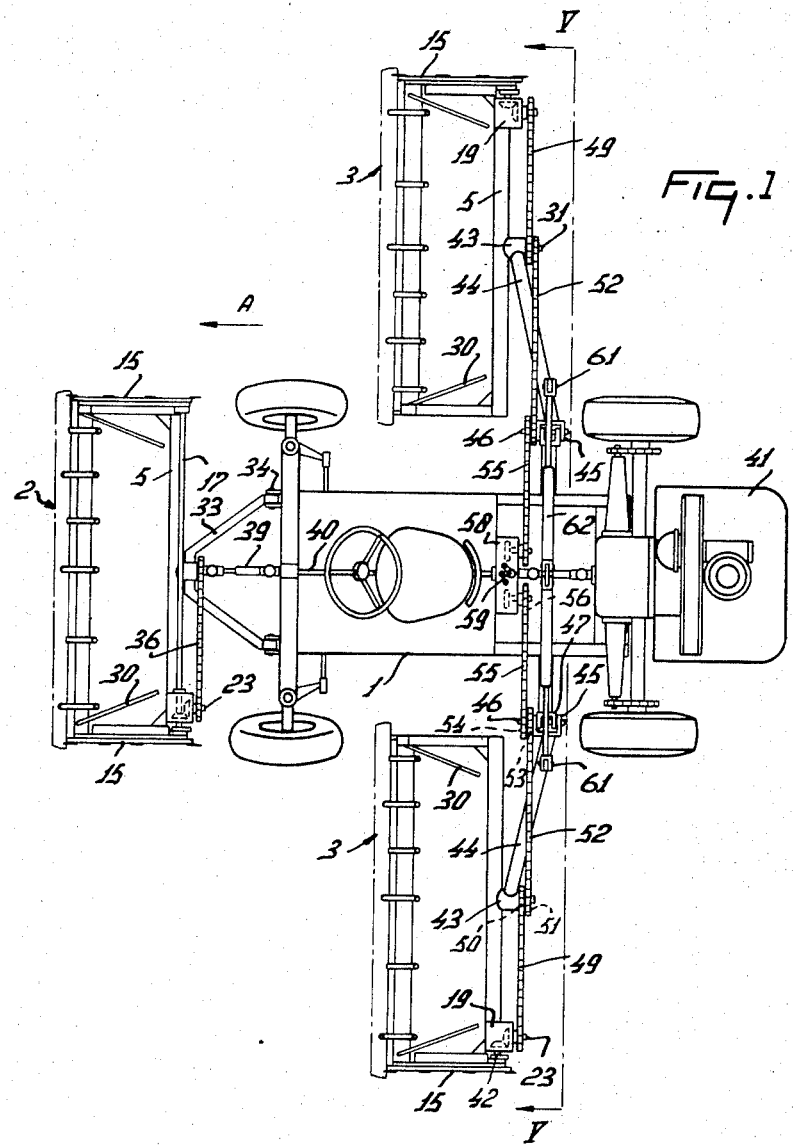

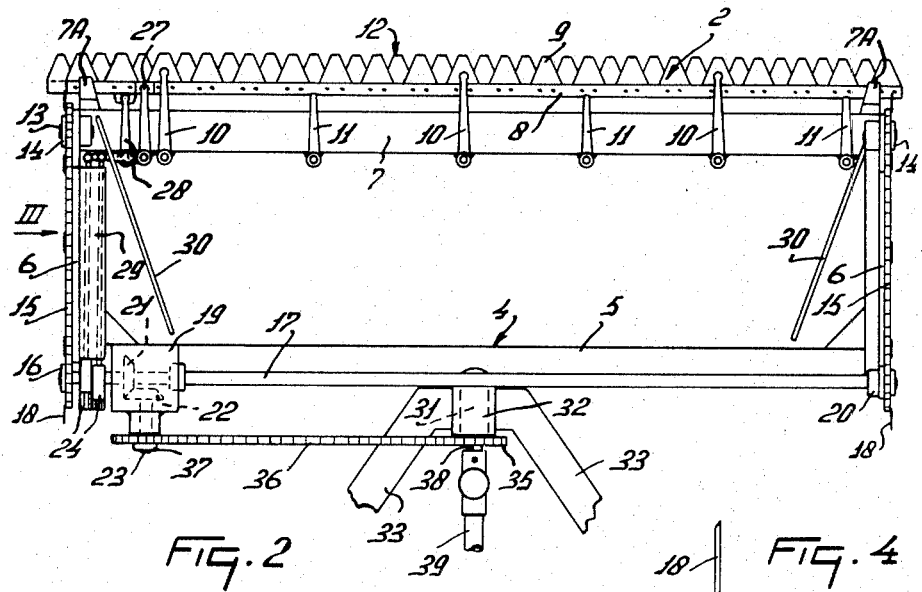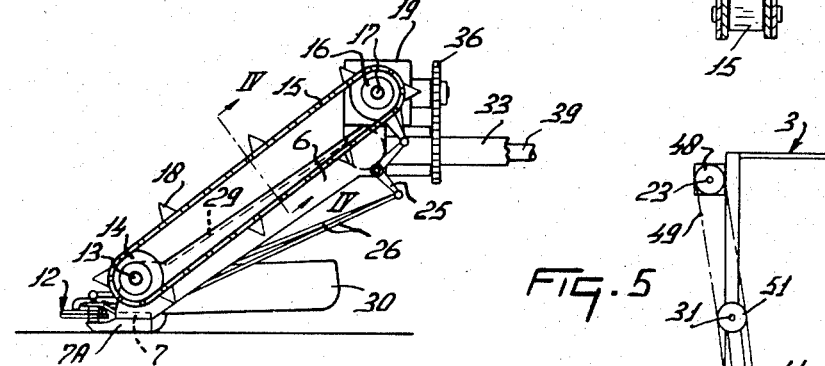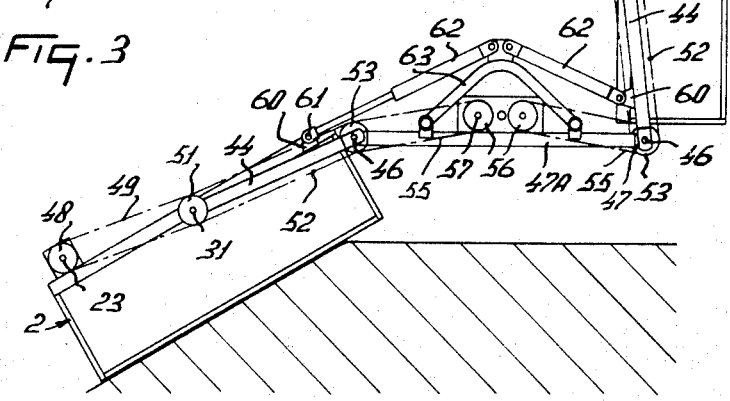

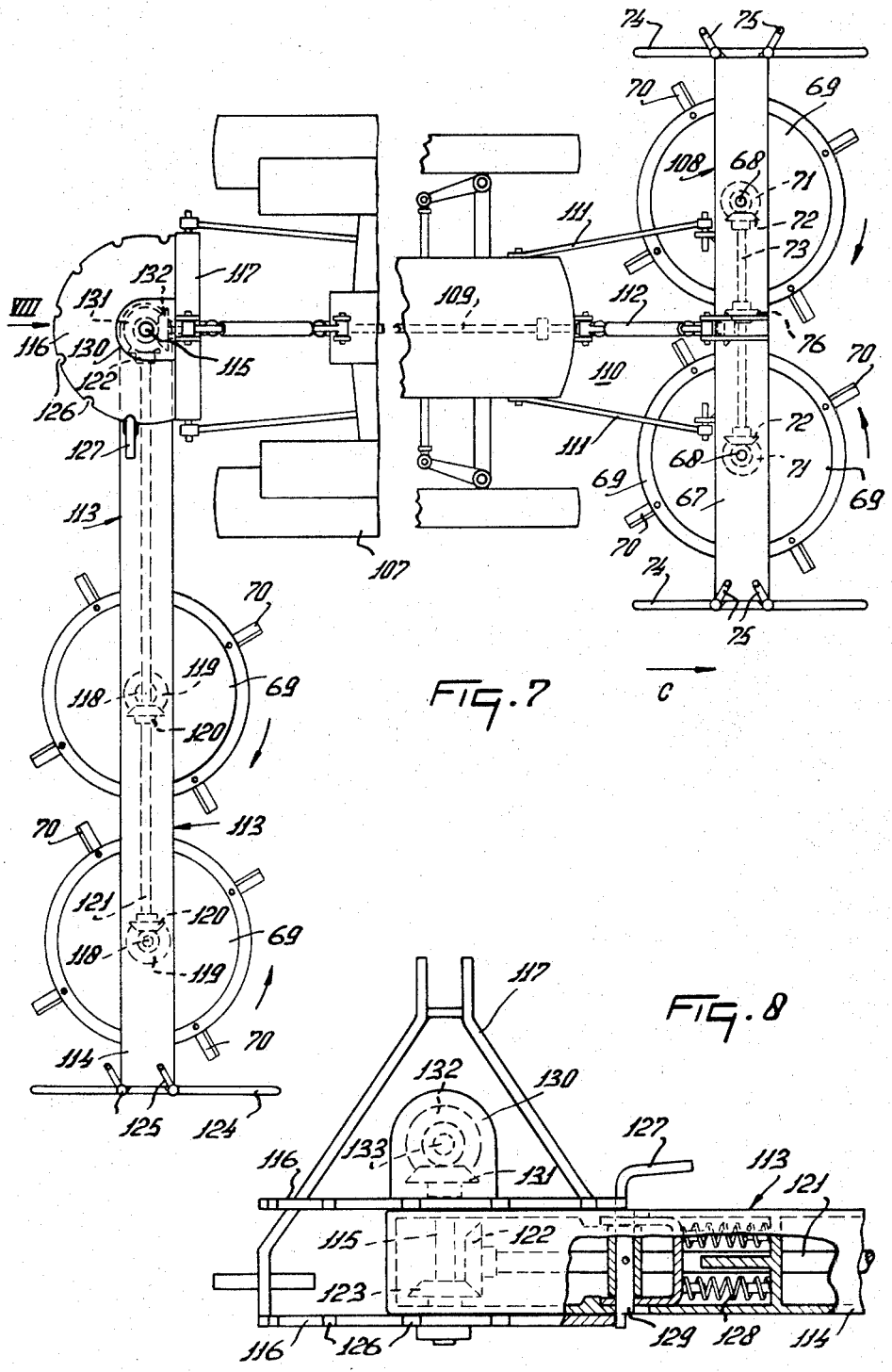

MOWING MACHINES

This application is a continuation of application Ser. No. 778,444, filed Nov. 25, 1968 and now abandoned.

For a better understanding of the invention, and to show how the same may be carried into effect, reference will now be made, by way of example, to the accompanying drawings, in which:

FIG. 1 is a plan view of a mowing machine in accordance with the invention,

FIG. 2 is a plan view, to an enlarged scale, of front parts of the mowing machine of FIG. 1, FIG. 3 is a side elevation as seen in the direction indicated by the arrow III of FIG. 2, FIG. 4 is a section, to an enlarged scale, taken on the line IV—IV of FIG. 3, FIG. 5 is a view as seen on the line V—V of FIG. 1, the supporting tractor or the like being omitted and the machine being shown in positions that differ from the position shown in FIG. 1, FIG. 6 is a plan view of an alternative form of mowing machine in accordance with the invention, FIG. 7 is a plan view of a still further alternative form of mowing machine in accordance with the invention, and FIG. 8 is a scrap rear view, partly broken away, as seen in the direction indicated by the arrow VIII of FIG. 7.

Referring to FIGS. 1 to 5 of the drawings, the mowing machine which is illustrated has a leading mowing mechanism 2 and two opposite lateral mowing mechanisms 3, all three mowing mechanisms being operatively connected to a mobile frame which, in the example which is being described, takes the form of a tractor 1. As can be seen in FIG. 1 of the drawings, the leading mowing mechanism 2 is located in front of the tractor 1 with respect to the intended direction of operative travel of the tractor and mowing machine combination which is indicated by an arrow A. The two lateral mowing mechanisms, on the other hand, are mid-mounted at opposite sides of the tractor 1 between the front and rear wheels of the latter with respect to the direction A. The leading mowing mechanism 2 has a frame 4 (FIG. 2) which includes a main frame beam 5 that extends substantially horizontally perpendicular to the direction A. The opposite ends of the main beam 5 have the ends of beams 6 connected to them in such a way that said beams 6 are inclined downwardly, and forwardly relative to the direction A, from said beam 5. The foremost and lowermost ends of the beams 6 are interconnected by a flat strip-shaped beam 7 that extends parallel to the main beam 5 and whose general plane is substantially horizontally disposed.

Co-operating cutter bars 8 and 9 are mounted between upper and lower guides 7A carried by opposite ends of the beam 7, said cutter bars 8 and 9 being reciprocable in directions parallel to their own lengths. The bars 8 and 9 are resiliently pressed into engagement with one another by upper fingers 10 and lower fingers 11 that are pivotally connected to the beam 7, the cutter bars 8 and 9 together forming a mowing beam which is generally indicated by the reference 12. The beams 6 support substantially horizontal bearings 13 adjacent the opposite ends of the beam 7 and corresponding sprocket wheels 14 (FIG. 3) are rotatably supported by said bearings. Each sprocket wheel 14 is in driven connection with a corresponding sprocket wheel 16 by way of an endless transmission chain 15. The two sprocket wheels 16 are located at the opposite ends of a rotary shaft 17 that extends parallel to the main beam 5 immediately above that beam. The transmission chains 15 carry triangular blades 18 at regular intervals therealong, said chains 15 and blades 18 together affording crop dividers that are movable around two axes (i.e. the axes defined by the bearings 13 and the shaft 17).

The shaft 17 is journalled, adjacent one of its ends, in a gear box 19 while its opposite end is supported by a bearing 20 that is carried by the corresponding beam 6 adjacent one of the sprocket wheels 16. The shaft 17 carries, inside the gear box 19, a bevel pinion 21 whose teeth are in driven mesh with those of a bevel pinion 22 carried by a substantially horizontal shaft 23 that extends parallel to the direction A and has an end which projects from the rear of the gear box 19. Two neighboring eccentric mechanisms 24 are mounted on the shaft 17 alongside the gear box 19, said mechanism 24 being 180° out of phase with respect to one another. The eccentrics 24 are arranged to drive corresponding rockers (bellcrank levers) 25 (FIG. 3) and said rockers 25 are linked by corresponding connecting rods 26 to further rockers 27 and 28 (FIG. 2) respectively. The rockers 27 and 28 are turnable about substantially vertical fulcrums and are arranged to reciprocate the cutter bars 8 and 9 respectively. A screening plate 29 is fastened to one of the beams 6 so as to overlie the two connecting rods 26. Swath boards 30 are secured to the beam 7 adjacent the opposite ends thereof and converge towards one another in a direction opposite to the direction A.

A strong stub shaft 31 is fastened to the main beam 5 so as to project rearwardly from the center of that beam in a direction parallel to the direction A. A sleeve bearing 32 surrounds the stub shaft 31 and is rigidly secured to two arms 33 that diverge rearwardly relative to the direction A and whose rearmost ends are pivotally connected to the front of the tractor 1 by horizontally aligned pins 34 (FIG. 1). The stub shaft 31 and sleeve bearing 32 form the sole supporting connection between the leading mowing mechanism 2 and the tractor 1 so that, during operation of the mowing machine, the mechanism 2 can turn about the substantially horizontal axis afforded by said parts 31 and 32 to match undulations in the surface of the ground over which it is travelling. It will be noted from FIG. 1 of the drawings that the stub shaft 31 and sleeve bearing 32 are located approximately centrally between the opposite ends of the leading mowing mechanism 2.

A sprocket wheel 35 is rotatably mounted at the rear end of the stub shaft 31 and is drivingly connected by an endless transmission chain 36 to a sprocket wheel 37 that is fastened to the rear end of the shaft 23. The rotatable sprocket wheel 35 is secured to a rearwardly projecting shaft 38 whose rearmost end is connected by a telescopic transmission shaft 39 having universal joints at its opposite ends to a driving shaft 40 extending substantially horizontally lengthwise of the tractor 1 in a position such that it is contained in, or located close to, a vertical plane of substantial symmetry of the tractor 1 that is parallel to the direction A. The tractor 1 has a rear mounted engine 41 and this engine, together with the rear axle casing and associated parts, is turnable with respect to the leading part of the tractor about a substantially horizontal axis that is parallel to the direction A. The driving shaft 40 is connected to a rotary output shaft of the engine 41 by way of a transmission which includes a further telescopic shaft having universal joints at its opposite ends. This arrangement can be seen in outline in FIG. 1 of the drawings.

The two lateral mowing mechanisms 3 are substantially identical in construction to the leading mowing mechanism 2 and it will therefore be understood that a full description of the mechanisms 3 is unnecessary. However, it can be seen in outline in FIG. 1 of the drawings that each of the mechanisms 3 has only one crop divider in the form of a chain 15 and blades 18, said crop dividers being provided at the ends of the two mechanisms 3 which are furthest remote from the tractor 1 during use of the machine. Each of the two crop dividers that have just been mentioned is driven through the intermediary of a shaft 42 rotatably mounted in the corresponding gear box 19, the outer ends of the shafts 42 carrying the corresponding sprocket wheels 16 while the inner ends are in driven connection with the corresponding shafts 23 by way of bevel pinions corresponding to the previously described pinions 21 and 22. Each of the stub shafts 31 corresponding to the two lateral mowing mechanisms 3 is surrounded by a sleeve bearing 43 mounted at the end of a corresponding arm 44. The opposite end of each arm 44 is provided with a fork 45 between the limbs of which the limbs of a corresponding smaller fork 47 are entered. The two forks 45 and 47 of each pair are pivotally interconnected by corresponding pins 46 that extend substantially horizontally parallel to the direction A. The two forks 47 are mounted at opposite ends of a support 47A (FIG. 5) which is fastened to the tractor 1. Each pin 46 affords a second pivotal axis that is located at one side of the lateral mowing mechanism 3 concerned and that extends substantially horizontally parallel to the direction A.

Each of the two shafts 23 that corresponds to one of the lateral mowing mechanisms 3 carries a sprocket wheel 48 at its rearmost end, each sprocket wheel 48 being in driven connection with a double sprocket wheel 51, that is rotatably mounted at the rear end of the corresponding stub shaft 31, by way of an endless transmission chain 49. Each double sprocket wheel 51 is in driven connection, by way of a corresponding endless transmission chain 52, with a double sprocket wheel 53 that is rotatably mounted at the leading end of the corresponding pivot pin 46. The two double sprocket wheels 53 are in driven connection, by way of corresponding endless transmission chains 55, with two sprocket wheels 56 that are mounted on corresponding shafts 57 that project from the rear of a casing 58 mounted on the tractor 1. The casing 58 contains parts of the transmission mentioned above and is provided with a selection lever 59 with the aid of which any one, any pair of all three of the mowing mechanisms 2 and 3 can be rendered inoperative.

Each arm 44 is provided with a lug 60 towards the end thereof having the fork 45. A pivot pin 61 connects each lug 60 to the piston rod of a corresponding hydraulic piston and cylinder assembly 62, the cylinders of the two assemblies being themselves pivotally connected to a bracket at the top of an arched frame beam 63 whose opposite ends are fastened to the support 47A. A similar hydraulic piston and cylinder assembly (not shown in the drawings) is mounted at the front of the tractor 1 in a position such that it can tilt the leading mowing mechanism 2 upwardly about the common axis of the pivot pins 34. The supply ducts to the assemblies 62 and the controls for those assemblies have also been omitted from the drawings for the sake of simplicity.

In the use of the mowing machine which has been described, the tractor and mowing machine combination is driven over the ground in the direction A with the aid of the rear wheels of the tractor 1 which are powered by the engine 41 through the intermediary of chain transmissions. The various chains transmit drive to the mowing mechanisms 2 and 3 by way of the driving shaft 40 and other transmission parts and the crop which is cut down by the mowing beams 12 is deposited on the ground in the form of three separate swaths (assuming that all three mowing mechanisms are operative). The swath boards 30 are so arranged that two of the swaths will be located at opposite sides of the tractor 1 beyond its ground wheels while the third swath will be located between the two swaths which have just been mentioned and also between the tracks of the front and rear ground wheels of the tractor 1. The crop dividers that have been described above act to separate crop being cut from crop which is still standing and tend to prevent clogging of the mowing mechanisms by long-stalked crop and the like. The selection lever 59 is used to place any one, any two or all three of the mowing mechanisms 2 and 3 in operation so that, when required, crop can be cut only at one side of the tractor 1 or only in the path of travel of said tractor. Either, or both, of the lateral mowing mechanisms 3 can be employed to cut crop growing on sloping ground at the side of the tractor 1 and this is shown in respect of the lefthand mechanism 3 in FIG. 5 of the drawings.

Any mowing mechanism which is not in use can be placed in a raised and inoperative position. This is effected by retracting the piston rod of the corresponding piston and cylinder assembly 62 as shown in respect of the right-hand mechanism 3 in FIG. 5 of the drawings. The leading mowing mechanism 2 is raised to an inoperative position by tilting the arms 33 upwardly about the pins 34 with the aid of the assembly 62 which is not illustrated. When the machine is to be moved from one place to another without performing any working operation, all three of the assemblies 62 are retracted so that both of the lateral mowing mechanisms 3 are tilted upwardly about the corresponding pivot pins 46 into the position which is shown for one of them in FIG. 5. The leading mowing mechanism 2 is tilted upwardly about the pins 34. It will be noted that the lateral mowing mechanisms 3 occupy substantially vertical settings which are such that the path of travel of the mowing machine and tractor combination is little greater than that of the tractor 1 alone. Stops (not shown) are provided adjacent the three stub shafts 31 and are engaged when any or all of the mowing mechanisms 2 and 3 are raised to inoperative positions so that said mowing mechanisms can no longer turn to any appreciable extent about said stub shafts 31. Although this has not been illustrated, a reel may, if desired, be provided immediately above each of the mowing mechanisms 2 and 3.

FIG. 6 of the drawings illustrates a mowing machine having a lateral mowing mechanism 65 that is mid-mounted between the front and rear ground wheels of a mobile frame which takes the form of a tractor 64. The mowing machine also includes a leading mowing mechanism 66 which is provided with a hollow box-shaped frame beam 67 that extends substantially horizontally perpendicular to the intended direction of operative travel of the mowing machine, said direction being indicated by an arrow B in FIG. 6 of the drawings. Two vertical or substantially vertical shafts 68 are journalled in the frame beam 67 in horizontally spaced relationship, the portions of said shafts 68 which project from the bottom of the beam 67 being provided with corresponding drum-shaped mowing elements 69 each of which has four radially projecting mowing blades 70 arranged at regular intervals around its foot. The ends of the shafts 68 that are located internally of the beam 67 are provided with bevel pinions 71 whose teeth are in driven mesh with those of bevel pinions 72 located at the opposite ends of a rotary shaft 73 which extends longitudinally of the interior of the beam 67. The opposite ends of the beam 67 are provided with ground-engaging slidable supports 74 that extend parallel to the direction B. The level of cut of the blades 70 and the inclination of the plane of cut to the ground can be governed by appropriate adjustments of two screw spindles 75 through the intermediary of which each support 74 is connected to one end of the beam 67. As can be seen in FIG. 6 of the drawings, the two spindles 75 of each pair lie one behind the other in relatively spaced relationship with respect to the direction B. The shaft 73 is provided approximately centrally with a bevel pinion 76 whose teeth are in driven mesh with those of a bevel pinion 77 mounted at the leading end of a shaft 78 that projects rearwardly from the beam 67 in a substantially horizontal direction. The shaft 78 is surrounded, externally of the beam 67, by a sleeve bearing 79 which is rigidly fastened to a pair of rearwardly diverging arms 80. The rearmost ends of the two arms 80 are pivotally connected by substantially horizontally aligned pins 81 to the front of the tractor 64, said pins 81 defining an axis which is substantially perpendicular to the direction B.

The rearmost end of the shaft 78 is connected by a telescopic transmission shaft 82 having universal joints at its opposite ends to a driving shaft 83, the latter shaft extending substantially horizontally in, or near to, a vertical plane of approximate symmetry of the tractor 64 that is parallel to the direction B. The rearmost end of the driving shaft 83 is connected by way of a transmission 84 to the rear-mounted engine 85 of the tractor 64 which engine is preferably one of about 90 to 100 horsepower. As in the preceding embodiment, the engine 85, parts of the transmission 84 and the rear axle casing and associated parts of the tractor 64 are turnable relative to the front of the tractor about an axis extending parallel to the direction B, means (not shown) being provided for retaining the two relatively adjustable parts of the tractor 64 in chosen settings about said axis with respect to one another.

The lateral mowing mechanism 65 is of substantially identical construction to the leading mowing mechanism 66 but the lateral mowing mechanism is provided, at its rear, with a worm conveyor or auger 87 rotatably supported by plates 86 that are fastened to the opposite ends of the beam 67. The plates 86 also carry a plate 88 which is located immediately beneath the auger 87 behind the mowing elements 69, said plate 88 assisting in defining a generally trough-shaped compartment in which the substantially horizontally extending auger 87 is accommodated.

A transmission shaft 96 projects rearwardly from a central region of the beam 67 of the lateral mowing mechanism 65 and is surrounded, externally of said beam 67, by a sleeve bearing 89. The sleeve bearing 89 is rigidly secured to the end of an arm 90 whose opposite end is pivotally connected by a pin 91, extending parallel to the direction B, to a support 92 rigid with the tractor 64. The pin 91 affords a pivotal axis extending parallel to the direction B and the ends of the arm 90 and support 92 that co-operate pivotally with the pin 91 are provided with forks that are similar to the previously described forks 45 and 47.

The driving shaft 83 is provided, towards its rear end, with a sprocket wheel 93 which is drivingly connected by an endless transmission chain 94 to a double sprocket wheel 95 rotatably mounted at the rear end of the pivot pin 91. The double sprocket wheel 95 is drivingly connected by an endless transmission chain 97 to a sprocket wheel that is fastened to the extreme rearmost end of the aforementioned transmission shaft 96. The shaft 73 that is located internally of the beam 67 has a portion 98 whose end projects from the end of said beam 67. The projecting end of the portion 98 carries a sprocket wheel 99 which is drivingly connected by an endless transmission chain 100 to a sprocket wheel 101 fastened to one end of the central supporting shaft 102 of the auger 87. The tractor 64 is provided, behind the engine 85, with a three-point lifting device or hitch 103 only the two lower lifting links of which are used for the mounting of a tool bar or tow bar 104.

In the use of the mowing machine illustrated in FIG. 6 of the drawings, the engine 85 of the tractor 64 drives the tractor and mowing machine combination over the ground in the direction B by rotating the rear wheels of said tractor 64 with the aid of chain transmissions. The mowing elements 69 are rotated in the directions indicated by the arrows in FIG. 6 from the engine 85 by way of the shaft 83 and the other transmission members. The crop cut down by the mowing elements 69 of the leading mowing mechanism 66 is collected in a single swath which lies between the paths of the wheels of the tractor 64 while the mowing elements 69 of the lateral mowing mechanism 65 deliver the crop which they cut to the auger 87. The auger 87 displaces the cut crop laterally and adds it to the swath already left by the leading mowing mechanism 66. The single swath which is thus formed between the rear wheels of the tractor 64 can thus be collected by a pick-up trailer or the like vehicle 105 whose draw bar is hitched to the tool bar or tow bar 104 and whose moving parts can be powered from a take-off shaft of the engine 85.

The lateral mowing mechanism 65 can be brought to a substantially vertical inoperative position with the aid of a hydraulic piston and cylinder assembly 106 which interconnects the arm 90 and a beam rigid with the tractor 64. A lock or stop (not shown) is engaged to prevent the shaft 96 from turning in the sleeve bearing 89 and the assembly 106 is retracted to turn the mechanism 65 upwardly about the pin 91. A hydraulic piston and cylinder assembly (not shown) that is similar to the assembly 106 is provided at the front of the tractor 64 to tilt the leading mechanism 66 upwardly about the aligned pivot pins 81, a lock or stop (not shown) also being engaged to prevent the shaft 78 from turning in the sleeve bearing 79. Hooks or other positive retaining means (not shown) may, if desired, be provided to guard against the mechanisms 65 and 66 returning accidentally from their inoperative to their operative positions.

Since the leading mowing mechanism 66 incorporates cutting mechanism in the form of at least two mowing elements that are rotatable about non-horizontal axes, constant supervision of the operation of said mechanism 66 by the driver of the tractor 64 is unnecessary in view of the fact that clogging of mowing elements of this type is extremely unusual. It is therefore advantageous that mowing mechanism such as the mechanism 66 should be arranged at the front of the tractor 65 because it is in this position that constant supervision, during operation, is most difficult to achieve. Either or both of the mowing mechanisms 65 and 66 may have more than two mowing elements 69 and, if desired, the auger 87 may be replaced by an endless conveyor arranged to carry the cut crop laterally towards the tractor 64.

It will be realized that, in the preceding embodiments, the tractors 1 and 64 are specially constructed for moving and operating mowing machines. However, the mowing machine which is illustrated in FIGS. 7 and 8 of the drawings can be used with a mobile frame in the form of a more or less conventional agricultural tractor 107. The mowing machine has a leading mowing mechanism 108 which corresponds in all respects other than its connection to the tractor 107 with the leading mowing mechanism 66 that has been described in relation to FIG. 6 of the drawings. The mowing elements 69 of the mechanism 108 are rotated from a driving shaft 109 of the tractor 107 that extends substantially horizontally parallel to the intended direction of operative travel of the mowing machine and tractor combination which is indicated by an arrow C in FIG. 7 of the drawings. The leading mowing mechanism 108 is connected to a three-point lifting device or hitch 110 at the front of the tractor 107, said device 110 having lower lifting links 111 which are pivotally connected to lugs at the rear of the frame 67 and an upper adjustable lifting link 112 which is pivotally connected to a bracket projecting upwardly from the top of the beam 67.

The mowing machine has a rear mowing mechanism 113 which is rear-mounted on a second three-point lifting device or hitch of the tractor 107 in such a way that its mowing elements 69 are located to one side of the path of travel of that tractor. The rear mowing mechanism 113 has a substantially horizontally extending hollow box-shaped frame beam 114 which is turnable about a substantially vertical axis afforded by a shaft 115 mounted between two horizontal plates 116. The plates 116 project rearwardly, in vertically spaced relationship, from a coupling member 117 that is constructed and arranged in generally known manner for attachment to the lifting device at the rear of the tractor 107 in the way which can be seen in FIG. 7 of the drawings.

The beam 114 accommodates two horizontally spaced apart substantially vertical shafts 118 the lowermost ends of which project downwardly from the bottom of said beam 114. The portions of said shafts 118 which have just been mentioned carry mowing elements 69 which are similar to the mowing elements 69 that have already been described. The upper ends of the shafts 118 that are located inside the beam 114 are provided with bevel pinions 119 whose teeth are in mesh with those of further bevel pinions 120 mounted on a shaft 121 that extends lengthwise of the hollow interior of the beam 114. The end of the shaft 121 which is closest to the coupling member 117 carries a bevel pinion 122 whose teeth are in mesh with those of a bevel pinion 123 secured to the aforementioned shaft 115 towards the lowermost end of that shaft.

The end of the beam 114 that is remote from the coupling member 117 carries a ground-engaging support 124 that extends parallel to the direction C, said support 124 being adjustably connected to the beam 114 through the intermediary of two screw spindles 125 arranged in the same manner as the previously described screw spindles 75. The two plates 116 have curved edges whose centers of curvature are coincident with the axis of the shaft 115, said edges being provided at regular intervals therearound with notched recesses 126. A locking pin 127 carried by the beam 114 is arranged to become lodged in an upper and lower pair of recesses 126 to maintain the beam 114 and the mowing elements 69 that are carried thereby in a corresponding angular setting about the axis of the shaft 115. As can be seen in FIG. 8 of the drawings, the pin 127 is connected to a bracket which is urged by compression springs 128 towards the curved edges of the plates 116. The plates 116, locking pin 127, springs 128 and associated parts together form an overload safety unit arranged to minimize or prevent damage upon the mowing mechanism 113 meeting an obstacle which it cannot overcome. When this happens, the turning moment about the shaft 115 rises rapidly until the locking pin 127 is forced out of the notches 126 which it is illustrated as occupying against the action of the springs 128. The whole beam 114 can then turn rearwardly about the shaft 115 to avoid the obstacle.

Angular adjustments of the beam 114 about the shaft 115 can be made without difficulty because the pin 127 is eccentrically connected to, or integral with, a shaft 129 and said pin 127 can be disengaged from the recesses 126 merely by turning the shaft 129 through approximately 180° about its own longitudinal axis, the springs 128 merely urging the carrying-bracket of the pin 127 into engagement with stops forming part of the beam 114. It will be apparent from the drawings that the beam 114 can be turned through 180° about the shaft 115 as compared with its illustrated position. However, when this is done, the direction of rotation of the corresponding mowing elements 69 must be reversed and a simple reverse gear (not shown) is provided so that this can be done without difficulty.

The uppermost end of the vertical shaft 115 carries a bevel pinion 131 whose teeth are in driven mesh with those of a bevel pinion 132 mounted at the rear end of a shaft 133 that extends substantially parallel to the direction C and whose leading end is coupled by a transmission shaft having universal joints at its opposite ends to the rear end of the driving shaft 109. The bevel pinions 131 and 132, the upper end of the shaft 115 and the rear end of the shaft 133 are all located internally of a gear box 130 fastened to the upper plate 116.

In the use of the mowing machine illustrated in FIGS. 7 and 8 of the drawings, the tractor 107 moves the machine over the ground in the direction C with the mowing elements 69 rotating in the directions indicated by the arrows illustrated in FIG. 7. Two swaths of cut crop are thus formed, one lying between the wheels of the tractor 107 while the other lies at the right-hand side of the path of travel of said tractor. If the rear mowing mechanism 113 should meet an obstacle which it cannot overcome, the overload safety unit will operate to allow the beam 113 to turn rearwardly until said obstacle can be avoided. Both of the mechanisms 108 and 113 can be lifted clear of the ground to inoperative positions merely by raising the lifting device 110 at the front of the tractor 107 and the similar lifting device at the rear of the tractor. Clearly, the machine will be transported from one place to another with the beam 114 occupying a position in which its length is substantially parallel to the longitudinal axis of the tractor 107.

What is claimed is:

1. A mowing machine for attachment to a prime mover comprising a mobile frame with at least two independent mowing mechanisms supported in spaced apart relationship on said frame, said mechanisms each including a frame beam extending transverse to the direction of travel with cutting means supported on said frame beam, the cutting means of at least the leading one of said mowing mechanisms comprising at least two neighboring mowing elements, each of said mowing elements being rotatable about a substantially vertical axis and having a plurality of cutting blades, the axis of each mowing element being a substantially vertical shaft which is in driving engagement with a rotary shaft connected to transmission shaft means and said mowing elements each being rotated in opposite directions and towards one another to deposit a single swath between the mowing elements; a movable conveyor supported on said frame to extend laterally of said mowing machine behind the rearmost mowing mechanism and driving means for moving said conveyor to displace cut crop from said rearmost mowing mechanism into the path already traveled by said leading mowing mechanism for forming a single swath of cut crop.

2. A mowing machine as claimed in claim 1, wherein said mowing elements are connected to common driving means for rotating same and said driving means include a driving transmission shaft which extends substantially parallel to the direction of travel of said machine.

3. A mowing machine as claimed in claim 1, wherein said rearmost mowing mechanism is driven by a driving element connected to the transmission of the prime mover and a driving assembly for said conveyor being interconnected to said driving element.

4. A mowing machine having a mobile frame and mowing means supported by said frame, said mowing means comprising at least two independent and spaced apart mowing mechanisms, each mechanism having at least two adjacent mowing elements each of which is rotatable about a substantially vertical axis, each of said mowing elements including a plurality of cutting blades, the rearmost of said mowing mechanisms being supported adjacent the rear of a prime mover relative to the direction of travel and said rearmost mechanism having at least one coupling member pivotally connected to said machine and turnable relative to the three-point lifting device at the rear of the prime mover, said rearmost mechanism being turnable through 180° about a substantially vertical shaft and movable as a whole to alternative working positions at either side of the machine or a transport position at the rear of the machine.

5. A mowing machine as claimed in claim 4, wherein an overload safety unit is included in said coupling member, said safety unit comprising a substantially vertical shaft about which said rearmost mowing mechanism is pivotable rearwardly when an obstacle is encountered.

6. A mowing machine as claimed in claim 5, wherein said safety unit includes a plate element with recesses mounted adjacent said rearmost mowing mechanism and a spring in a spring-loaded pin which is receivable in one of said recesses whereby said pin can be forced to ride out any of said recesses against the action of said spring when an obstacle is encountered.

7. A mowing machine for attachment to a wheeled prime mover comprising a mobile frame with at least two independent mowing mechanisms supported in spaced apart relationship on said frame, said mechanisms each including a frame beam extending transverse to the direction of travel with cutting means supported on said frame beam, the cutting means of at least the leading one of said mowing mechanisms being attached directly in front of the prime mover and comprising at least two neighboring mowing elements, the mowing elements of said leading mowing mechanism having cutting blades rotatable towards one another about substantially vertical axes and positioned to deposit a single swath of cut crop between said mowing elements and between the front wheels of the prime mover substantially centrally thereof, a movable conveyor supported on said frame to extend laterally of said mowing machine behind the rearmost mowing mechanism and driving means for moving said conveyor to displace cut crop from said rearmost mowing mechanism in front of the rear wheels of the prime mover into the path already traveled by said leading mowing mechanism for forming a single swath of cut crop.

8. A mowing machine as claimed in claim 7, wherein the rearmost mowing mechanism extends laterally of the central portion of the prime mover and comprises two mowing elements which rotate about substantially vertical axes.

9. A mowing machine as claimed in claim 7, wherein a pick up trailer is towed to the rear of the prime mover to pick up the single swath of crop.

* * * * *